Feb. 16, 1932.   S. A. HAINES   1,845,020
BEVERAGE BREWING DEVICE
Filed Aug. 19, 1929
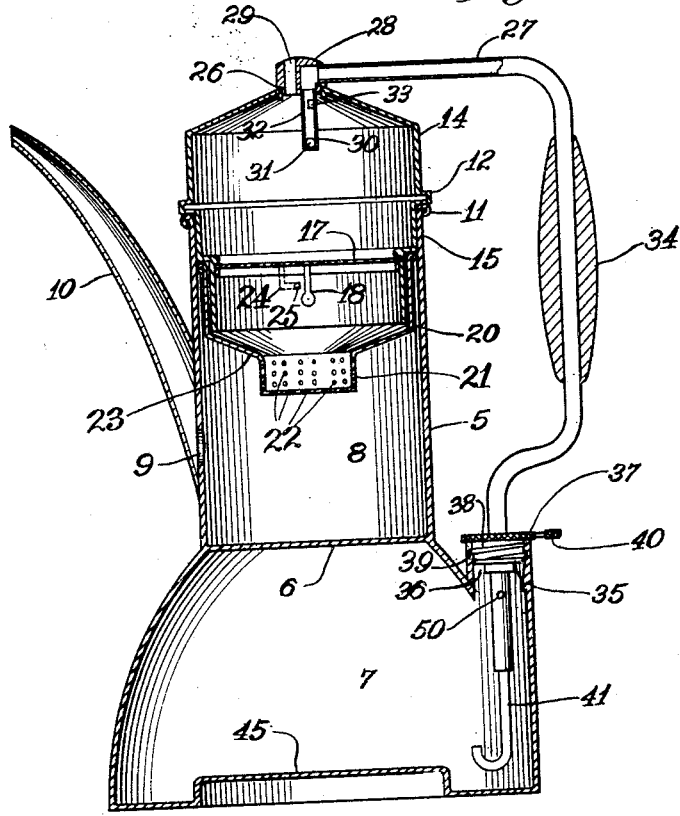
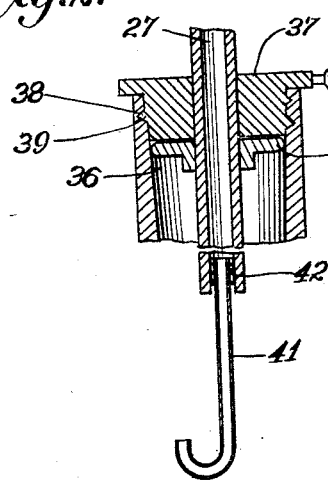
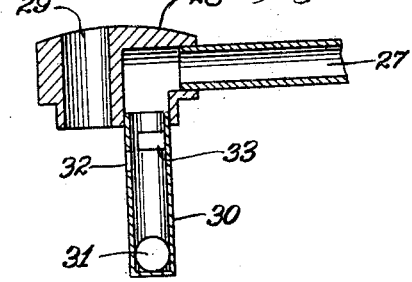
INVENTOR:
STACEY A. HAINES,
BY Chas. W. Gerard
ATTORNEY.

Patented Feb. 16, 1932

1,845,020

UNITED STATES PATENT OFFICE

STACEY A. HAINES, OF KANSAS CITY, MISSOURI, ASSIGNOR OF ONE-HALF TO HAROLD F. SPENCER, OF KANSAS CITY, MISSOURI

BEVERAGE BREWING DEVICE

Application filed August 19, 1929. Serial No. 386,958.

The present invention relates to beverage brewing devices, such as used for the preparation of coffee, tea or the like, and the primary object in view is to device an improved form of the apparatus for the automatic infusion of such beverage material, or for the making of extracts, decoctions, or other infusions, regardless of the material used.

Accordingly, one of the objects in view is to provide an appliance comprising a combined boiler chamber and an infusion chamber in the same receptacle, with a conduit member providing communication between the chambers, together with a cover member for the infusion compartment and a terminal fitting between the conduit member and cover member providing a vent opening and also permitting convenient attachment or removal of the conduit member as required.

The invention also comprises improved means for ready detachment of the conduit member from the boiler chamber as well as for a quick locking operation of the conduit member in place, whereby the cover member and parts carried thereby are securely locked in operative position.

A further feature of the improvements lies in the provision of an improved combination cover and filtering receptacle which is suspended from the cover member within the infusion chamber, and is of such a character as to provide for the effective treatment of varying quantities of the coffee or other material.

A still further feature of the improvements comprises an improved extension tube device for the lower end of the conduit member for varying the extent to which the latter is submerged in the liquid in the boiler chamber.

With these various objects in view, as well as minor objects as will appear in the course of the detailed specification, the invention will now be described by reference to the accompanying drawings, illustrating one form of construction which I have devised for embodying the proposed improvements, after which those features and combinations deemed to be novel will be set forth and claimed.

In the drawings—

Figure 1 is a central vertical sectional view, illustrating an appliance constructed in accordance with the present invention; and Figures 2 to 3 are detail sectional views, hereinafter referred to.

Referring now to the drawings in detail, these illustrate an appliance constructed of any suitable material to form a receptacle or container 5 divided by a horizontal partition 6 into a lower boiler chamber 7 and an upper infusion chamber 8 having the usual outlet opening 9 communicating with the spout 10. The upper edge of the receptacle is formed with a suitable roll or marginal bead 11 for supporting engagement with a similar bead 12 on the exterior of a cover member 14 which is also formed with a depending skirt portion 15 projecting into the upper part of the infusion chamber 8, said skirt portion 15 having an intermediate annular shoulder 16 forming a stop against which a perforated distributing plate 17 may be suitably shouldered as illustrated in Figure 1, the plate 17 having a stem 18 serving as a handle element and the plate being of a diameter adapted to fit frictionally within the lower portion of said skirt 15.

To the exterior of the lower end of said skirt 15 is telescopingly fitted a filtering receptacle 20 having a material receiving portion 21 formed with the bottom and side perforations 22, from which said receptacle flares outwardly and upwardly to provide an intermediate material receiving portion of gradually increasing diameter as indicated at 23, the upper portion of said receptacle being detachably secured, by the pin and bayonet-slot arrangement 24—25, to the skirt member 15.

The cover member 14 is formed with an upper central opening 26 for connection with a conduit tube 27 which provides a communicating passage between the boiler chamber 7 and infusion chamber 8, the upper end of said tube being provided with a terminal fitting 28 having a vent passage 29, and also provided with an audible signal element, such as the whistle tube 30 containing a ball 31 and formed with a whistle orifice 32 below the internal projection 33 also serving as the discharge opening for the liquid or steam from the boiler chamber.

The exterior portion of the conduit tube 27 serves as a handle for the device, being provided with the hand grip element 34 and having its lower end portion provided with a disk or plug 35 adapted to form a closure for the mouth of the filler opening 36 to the boiler chamber 7. The lower end portion of the tube 27 is securely locked in engagement with the mouth of the filler opening 36, by a locking device 37 having cam elements 38 adapted for cooperative engagement with similar half-threads or cam elements 39, substantially as set forth in my co-pending application, filed concurrently herewith. The locking half-threads element 37 is provided with a finger piece 40 or equivalent means for manually imparting a half turn to the locking element 37 in the locking or unlocking of the tube 27.

The lower end of the tube 27 is provided with a J-shaped tubular extension 41 having a plunger element 42 fitted slidingly within the end of said tube 27 for convenient adjustment of the extent to which the open end of the extension 41 is submerged in the liquid in the boiler chamber 7, and thus varying the extent of the infusion period, which of course depends upon the level to which the liquid is boiled away within the boiler chamber 7.

I also prefer to provide an additional vent opening 50 in the lower end of the tube connection 27 (as represented in Figure 1) for eliminating any preliminary thermosiphonic action in the operation, and thus insuring that no liquid will be conducted over into the infusion chamber until the contents of the chamber 7 have reached the boiling point.

The mouth of the filler opening 36 is arranged in horizontal position, and, as in my co-pending application referred to, is of ample size for facilitating the filling of the boiler chamber from a hydrant, without objectionable interruption of the flow of water into said chamber by the escape of air therefrom. The bottom of the boiler chamber 7 is also formed with an inset central portion 45 to provide an external recess for accommodating a heating element, as illustrated in my co-pending application, for compactness and substantial mounting of the device in operative relation to a heating appliance, where the latter is formed as a separate structure.

It will thus be apparent that I have devised a practical, simple and efficient appliance for carrying out the desired objects of my invention. In operation, the cover structure is removed by unlocking the device 37 and the filtering receptacle 20 detached, for placing the desired amount of material therein, after which it is replaced, and a suitable quantity of water allowed to flow into the boiler chamber 7, following which the cover structure is replaced with the tubular extension 41 adjusted to the proper height, and the parts locked in assembled relation by means of the locking element 37.

As the contents of the boiler chamber are heated, the liquid is forced by steam pressure action through the tube 27 into the infusion chamber 8, where the infusion operation takes place after the usual manner of the so-called French drip action, being spread by the distributor plate 17 over the contents of the filtering receptacle and thereafter gradually percolating through the material therein and collecting in the lower portion of the chamber 8. After the level of the intake end of the tubular extension 41 is reached in the boiler chamber, the liquid flow will stop, and steam is transmitted by way of the tube 27 into the chamber 8, thereby producing an audible signal, as by a whistling sound by the action of the element 30, thus giving a warning signal that the infusion operation has been completed. The character of the signal element 30 may be so varied as to alter the type or nature of the signal sound to any desired extent, in order that the attendant may know from the character of the signal the stage of the infusion operation or the extent to which the same has progressed.

The type of filtering receptacle provided embodies all the advantages of the construction of said receptacle as disclosed in my co-pending application, as regards the effective treatment of variable amounts of the material therein, without either inadequate or excessive treatment of the same in the infusion operation, and providing such a receptacle in the form of a detachable connection in combination with the skirt portion of a cover member as herein illustrated.

While I have shown and described what I now regard as the preferred form of construction for embodying the proposed improvements, I desire to reserve the right to make all such changes or modifications as may fairly fall within the scope of the appended claims.

Having thus described my invention, what I claim and desire to secure by Letters Patent is:

1. A beverage brewing device comprising a receptacle divided into an upper infusion receiving chamber and a lower boiler chamber having a filler opening, a cover member for the upper compartment provided with an opening, a tube providing communication between said boiler and infusion chamber and forming an exterior handle member for the receptacle, a terminal fitting carried by the upper end of said tube in engagement with the cover opening and formed with a vent opening, and means for locking the lower portion of said tube in engagement with said filler opening.

2. A beverage brewing device comprising a receptacle divided into an upper infusion receiving chamber and a lower boiler chamber having a filler opening, a cover member for the upper compartment provided with an opening, a tube providing communication between said boiler and infusion chambers and forming an exterior handle member for the receptacle, a terminal fitting carried by the upper end of said tube in engagement with the cover opening and formed with a vent opening, an audible signal element carried by the upper end of said tube and projecting through said cover opening into said infusion chamber, and means for locking the lower portion of said tube in engagement with said filler opening.

3. A beverage brewing device comprising a receptacle divided into an upper infusion receiving chamber and a lower boiler chamber having a filler opening, a cover member for the upper compartment formed with a skirt portion depending within said infusion chamber, a perforated distributing plate inside said skirt portion, and a filtering receptacle detachably connected with said skirt portion and formed with a perforated lower material receiving portion of graduated diameter for the treatment of varying amounts of the material.

In witness whereof I hereunto affix my signature.

STACEY A. HAINES.